US010125287B2

(12) United States Patent
Tomko et al.

(10) Patent No.: US 10,125,287 B2
(45) Date of Patent: *Nov. 13, 2018

(54) PIGMENT COMPLEXES FOR WATER BORNE COATING COMPOSITIONS

(71) Applicant: THE SHERWIN-WILLIAMS COMPANY, Cleveland, OH (US)

(72) Inventors: Revathi R Tomko, Westlake, OH (US); Wanda J Smith, Macedonia, OH (US); Kimberly A Koglin, Olmsted Falls, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 34 days.

This patent is subject to a terminal disclaimer.

(21) Appl. No.: 15/252,255

(22) Filed: Aug. 31, 2016

(65) Prior Publication Data
US 2018/0002557 A1 Jan. 4, 2018

Related U.S. Application Data

(60) Provisional application No. 62/356,836, filed on Jun. 30, 3016.

(51) Int. Cl.
| | |
|---|---|
| C09D 131/04 | (2006.01) |
| C08K 3/22 | (2006.01) |
| C08K 3/20 | (2006.01) |
| C09D 143/02 | (2006.01) |
| C09D 133/14 | (2006.01) |
| C08K 3/36 | (2006.01) |
| C08F 218/08 | (2006.01) |
| C09C 3/00 | (2006.01) |
| C09D 4/00 | (2006.01) |
| C09D 5/02 | (2006.01) |
| C09D 7/65 | (2018.01) |
| C08F 230/02 | (2006.01) |
| C08F 220/28 | (2006.01) |
| C08F 18/08 | (2006.01) |
| C08F 18/04 | (2006.01) |
| C08K 3/26 | (2006.01) |
| C08K 3/34 | (2006.01) |
| C08L 43/02 | (2006.01) |
| C08K 3/30 | (2006.01) |
| C08K 5/521 | (2006.01) |

(52) U.S. Cl.
CPC .......... *C09D 131/04* (2013.01); *C08F 218/08* (2013.01); *C08K 3/20* (2013.01); *C08K 3/22* (2013.01); *C08K 3/36* (2013.01); *C09C 3/00* (2013.01); *C09D 4/00* (2013.01); *C09D 5/027* (2013.01); *C09D 7/65* (2018.01); *C09D 133/14* (2013.01); *C09D 143/02* (2013.01); *C08F 18/04* (2013.01); *C08F 18/08* (2013.01); *C08F 230/02* (2013.01); *C08F 2220/287* (2013.01); *C08K 3/346* (2013.01); *C08K 5/521* (2013.01); *C08K 2003/222* (2013.01); *C08K 2003/2224* (2013.01); *C08K 2003/2227* (2013.01); *C08K 2003/2241* (2013.01); *C08K 2003/2296* (2013.01); *C08K 2003/265* (2013.01); *C08K 2003/3045* (2013.01); *C08L 43/02* (2013.01)

(58) Field of Classification Search
CPC .......... C08K 2003/2241; C09D 131/04; C09D 133/04; C09D 133/14; C09D 135/02; C09D 4/00; C09D 143/02; C09D 7/125; C09D 5/027; C08F 218/08; C08F 218/10; C08F 230/02; C08F 18/04; C08F 18/08; C08F 220/06; C08F 220/18; C08F 2220/1825; C08F 2220/287; C08F 226/06; C08L 43/02; C09C 3/00
See application file for complete search history.

(56) References Cited

U.S. PATENT DOCUMENTS

| | | | |
|---|---|---|---|
| 4,001,150 A * | 1/1977 | Juna | C08F 28/00 523/509 |
| 4,171,228 A | 10/1979 | Lowrey | |
| 5,385,960 A | 1/1995 | Emmons et al. | |
| 5,412,019 A | 5/1995 | Roulstone et al. | |
| 5,663,224 A | 9/1997 | Emmons et al. | |

(Continued)

FOREIGN PATENT DOCUMENTS

| | | |
|---|---|---|
| EP | 0625541 B1 | 3/1999 |
| EP | 2426166 B1 | 4/2014 |

(Continued)

OTHER PUBLICATIONS

The International Search Report of the International Searching Authority, dated Sep. 22, 2017.

(Continued)

Primary Examiner — Satya B Sastri
(74) Attorney, Agent, or Firm — Daniel S. Ward; James C. Scott; Daniel A. Sherwin

(57) ABSTRACT

Copolymers and latex paint compositions using such copolymers that are heat-age stable and provide good adhesion, block resistance, and hiding all while using lower amounts of titanium dioxide are described herein. In one aspect, the heat-age stable compositions include an acrylic, styrene acrylic, vinyl acrylic copolymer or blends thereof including, as additional polymerizable units, at least one polymerizable phosphate surfactant and at least one linear or branched hydrophobic monomer that are both polymerized into the acrylic, styrene acrylic, vinyl acrylic copolymer backbone.

9 Claims, No Drawings

(56) References Cited

U.S. PATENT DOCUMENTS

| | | | |
|---|---|---|---|
| 5,969,032 A * | 10/1999 | Phan | C08F 226/02 524/457 |
| 6,080,802 A | 6/2000 | Emmons et al. | |
| 6,214,467 B1 | 4/2001 | Edwards et al. | |
| 6,576,051 B2 | 6/2003 | Bardman et al. | |
| 6,638,998 B2 * | 10/2003 | Zhao | C09D 5/027 524/127 |
| 6,710,161 B2 | 3/2004 | Bardman et al. | |
| 6,890,983 B2 | 5/2005 | Rosano et al. | |
| 6,933,415 B2 | 8/2005 | Zhao et al. | |
| 7,081,488 B2 | 7/2006 | Bardman et al. | |
| 7,160,970 B2 | 1/2007 | Creamer et al. | |
| 7,179,531 B2 | 2/2007 | Brown et al. | |
| 7,265,166 B2 | 9/2007 | Gebhard et al. | |
| 7,488,534 B2 | 2/2009 | Koller et al. | |
| 7,919,556 B2 | 4/2011 | Koziski et al. | |
| 7,960,026 B2 | 6/2011 | Koller et al. | |
| 8,105,689 B2 | 1/2012 | Craciun et al. | |
| 8,293,825 B2 * | 10/2012 | Terrenoire | C08F 220/18 524/130 |
| 8,318,848 B2 | 11/2012 | Finegan et al. | |
| 8,710,133 B2 | 4/2014 | Bohling et al. | |
| 8,765,183 B2 | 7/2014 | Hawkett et al. | |
| 8,785,519 B2 | 7/2014 | Krishnan | |
| 8,822,569 B2 | 9/2014 | Bardman et al. | |
| 8,906,982 B2 | 12/2014 | Bardman et al. | |
| 9,156,920 B2 * | 10/2015 | Daniels | C08F 210/02 |
| 9,284,467 B2 | 3/2016 | Booth et al. | |
| 9,346,970 B2 * | 5/2016 | Bohling | C08F 2/22 |
| 9,505,944 B2 * | 11/2016 | Bohling | C09D 131/04 |
| 2003/0018103 A1 | 1/2003 | Bardman et al. | |
| 2003/0100671 A1 * | 5/2003 | Pierre | C09D 123/0853 524/710 |
| 2003/0108667 A1 | 6/2003 | McIntyre et al. | |
| 2003/0144399 A1 | 7/2003 | Matta et al. | |
| 2005/0256257 A1 * | 11/2005 | Betremieux | C08F 2/22 524/556 |
| 2008/0207774 A1 | 8/2008 | Krishnan | |
| 2010/0056668 A1 | 3/2010 | Brown | |
| 2015/0080521 A1 | 3/2015 | Korenkiewicz et al. | |
| 2015/0191589 A1 * | 7/2015 | Cai | C08F 220/10 524/547 |
| 2015/0259561 A1 * | 9/2015 | DeRocher | C08K 9/04 524/157 |
| 2015/0266980 A1 | 9/2015 | Martinez-Castro et al. | |
| 2016/0177081 A1 * | 6/2016 | Bohling | C08L 31/04 523/122 |
| 2016/0280952 A1 * | 9/2016 | Sun | C08F 2/22 |
| 2016/0347912 A1 * | 12/2016 | Madle | C09D 5/02 |

FOREIGN PATENT DOCUMENTS

| | | | |
|---|---|---|---|
| EP | 3002301 A1 | 4/2016 | |
| WO | WO-0006611 A1 * | 2/2000 | C08F 2/28 |
| WO | 2015065635 A1 | 5/2015 | |
| WO | 2016073345 A1 | 5/2015 | |
| WO | WO-2016015236 A1 * | 2/2016 | C08F 220/10 |
| WO | WO-2016015239 A1 * | 2/2016 | C09D 143/02 |

OTHER PUBLICATIONS

Written Opinion of the International Searching Authority, dated Sep. 22, 2017.

* cited by examiner

PIGMENT COMPLEXES FOR WATER BORNE COATING COMPOSITIONS

This application claims the benefit of U.S. provisional application No. 62/356,836 filed on Jun. 30, 2016, the entirety of which is hereby incorporated by reference.

BACKGROUND

1. Field of the Invention

This application relates to stable pigment-complexes for coating compositions and polymers thereof with good adhesion, block resistance, and hiding. In other approaches, the application relates to low or no VOC heat-age stable latex coating compositions with latex polymers and titanium dioxide to provide good adhesion, block resistance, and hiding with reduced levels of titanium dioxide.

2. Description of Related Art

Paints typically contain four ingredients: a carrier liquid, a binder, one or more pigments, and one or more additives to provide the paint with desired properties. Each such ingredient may comprise a single component or several different components mixed into the paint.

The carrier liquid is a fluid component of the paint which serves to carry all of the other paint components. The carrier liquid is part of the wet paint and usually evaporates as the paint forms a film and dries on a surface. In latex paints, the carrier liquid is usually water. In oil-based paints, the carrier liquid is usually an organic solvent.

The binder component of paint is what causes the paint to form a film on and adhere to a surface. In a latex paint, the binder comprises a latex resin, usually selected from acrylics, vinyl acrylics, or styrene acrylics or blends thereof in varying ratios. In a latex paint, the latex resin particles usually are in a dispersion with water as the carrier liquid.

Pigments provide the paint with both decorative and protective features. Pigments are solid particles used to provide the paint with various qualities, including but not limited to color, opacity, and durability. The paint may also contain other solid particles such as polyurethane beads or other solids. Pigments and other solids add bulk to the paint and their levels are related to the gloss or flatness of the paint.

A multitude of other additives may be included as needed for particular application in the paints. The additives are typically used at relatively low levels in the paint formulation, but contribute to various properties of paints, including but not limited to, rheology, stability, paint performance, and application quality.

The pigments used in a water-borne paint composition typically include an opacifying pigment, which imparts opacity or hiding to the paint film. One of the most effective and, hence, one of the most widely used opacifying pigments is titanium dioxide or TiO2. Although very effective, titanium dioxide is expensive and in many applications is the most expensive component of a water-borne paint composition. Accordingly, it is desirable to achieve the desired degree of hiding and other paint characteristics using the least amount of titanium dioxide possible. Various paint compositions have been proposed for utilizing titanium dioxide more efficiently; however, most of these paint compositions are less desired and such compositions also tend to be less stable over time.

SUMMARY

In one aspect, a stable latex paint composition is provided that includes, in some approaches, a titanium dioxide-polymer complex or association that provides enhanced adhesion, block resistance and hiding with lower levels of titanium dioxide. In some approaches, the paint composition includes an acrylic, styrene acrylic or vinyl acrylic copolymer or blends thereof, including, as polymerizable units, at least one polymerizable phosphate surfactant and at least one linear or branched hydrophobic monomer; a titanium dioxide particle associated with the acrylic, styrene acrylic or vinyl acrylic copolymer or blends thereof forming the titanium dioxide-polymer complex or association; water; and wherein the stable latex paint composition exhibits good hiding as evidenced by a contrast ratio of about 0.9 to about 0.99 and a y-reflectance of about 90 to about 100 when the composition has a titanium dioxide or particle loading factor expressed as a weight ratio of titanium dioxide to the acrylic, styrene acrylic or vinyl acrylic copolymer of greater than 1:2.1, and in other approaches greater than 1:2.2. To this end, the latex paint compositions of the present disclosure achieve desired characteristics, such as paint hiding, in a stable paint using less titanium dioxide relative to the polymer.

The latex paint composition noted above may be combinable with one or more other approaches, individually or in combination, as noted below. For instance, the latex paint composition may further exhibit a heat-age stability as evidenced by less than about 5 to about 10 KU viscosity unit increase after 4 weeks aging at about 140° F. (preferably, the aged KU viscosity is no more than 5 KU units greater than the initial viscosity after heat aging); the latex paint composition may include about 30 to about 50 weight percent of the acrylic, styrene acrylic or vinyl acrylic copolymer, and about 10 to about 25 weight percent of the titanium dioxide; the copolymer of the composition may further includes ureido monomers, amino monomers, sulfonate monomers or surfactants, acetoacetate monomers, epoxy monomers, carbonyl monomers, amide monomers, silane monomers, phosphate monomers or surfactants, carboxyl monomers or surfactants, and combinations thereof; the at least one polymerizable phosphate surfactant may include propoxylated or ethoxylated phosphate acrylate or propoxylated or ethoxylated phosphate methacrylate and mixtures thereof; the at least one linear or branched hydrophobic monomer may include butylacrylate or methacrylate, isobutylacrylate or methacrylate, tertiary butyl acrylate or methacrylate, ethyl hexyl acrylate or methacrylate, lauryl acrylate or methacrylate, octyl acrylate or methacrylate, isooctyl acrylate or methacrylate, dibutyl maleate, dioctyl maleate, branched or vinyl esters, combinations thereof and the like monomers; the linear or branched hydrophobic monomers may include a vinyl ester with a C4 to C30 linear or branched carbon chain; at least a portion of the polymerizable phosphate surfactants may be polymerized adjacent to the linear or branched hydrophobic monomers; the composition may further include additional polymerizable units selected from the group consisting of vinyl acetate, alkyl acrylate, alkyl methacrylate, acrylic, styrene acrylic, allyl imidazolidinone, allyl hydroxyoproyl sodium sulfate, and combinations thereof; the copolymer may further comprise about 0.1 to about 5 weight percent of the polymerizable phosphate surfactants and about 1 to about 30 weight percent of the linear or branched hydrophobic monomers; the copolymer may further comprise about 60 to about 90 weight percent of vinyl acetate and about 10 to about 25 weight percent of alkyl acrylate or alkyl methacrylate; the copolymer may further include a phosphate to hydrophobic monomer relationship in terms of a weight ratio of the polymerizable phosphate surfactants (on an active basis) to the linear or branched hydrophobic monomers of about 1:5 to about 1:20; the polymerizable phosphate surfactants may have a weight average molecular weight of about 100 to about 1500, in other approaches, about 100 to about 1000, and in yet other approaches, about 100 to about 500; and/or the composition may further include extender pigments, rheology modifiers, surfactants, and combinations thereof.

According to another aspect, a titanium dioxide-polymer composition or complex for a paint composition is provided that is configured, in some approaches, to provide enhanced adhesion, block resistance, and hiding with less pigment when used in a paint composition. The titanium dioxide-polymer composition or complex includes an acrylic, styrene acrylic or vinyl acrylic copolymer or blends thereof with, as polymerizable units, at least one polymerizable phosphate surfactant and at least one linear or branched hydrophobic monomer. The composition or complex also has a titanium dioxide particle associated with the acrylic, styrene acrylic or vinyl acrylic copolymer forming the titanium dioxide-polymer composition or complex. The polymer is configured to provide the improved properties even when using less titanium dioxide, other pigment, or other inorganic particles in the paint while providing a stable polymer at the same time.

The titanium dioxide-polymer complex noted above may be combinable with one or more other approaches, individually or in combination, as noted below. For instance, the copolymer may include ureido monomers, amino monomers, sulfonate monomers or surfactants, acetoacetate monomers, epoxy monomers, carbonyl monomers, amide monomers, silane monomers, phosphate monomers or surfactants, carboxyl monomers or surfactants, and combinations thereof; the at least one polymerizable phosphate surfactant may include propoxylated or ethoxylated phosphate acrylate or propoxylated or ethoxylated phosphate methacrylate and mixtures thereof; the at least one linear or branched hydrophobic monomer may include butylacrylate or methacrylate, isobutylacrylate or methacrylate, tertiary butyl acrylate or methacrylate, ethyl hexyl acrylate or methacrylate, lauryl acrylate or methacrylate, octyl acrylate or methacrylate, isooctyl acrylate or methacrylate, dibutyl maleate, dioctyl maleate, branched or vinyl esters, combinations thereof, and like monomers; the linear or branched hydrophobic monomers may include a vinyl ester with a C4 to C30 linear or branched carbon chain; at least a portion of the polymerizable phosphate surfactants may be polymerized adjacent to the linear or branched hydrophobic monomers; the polymer may further include additional polymerizable units selected from the group consisting of vinyl acetate, alkyl acrylate, alkyl methacrylate, acrylic, styrene acrylic, allyl imidazolidinone, allyl acetoacetate, allyl epoxy, allyl glycidyl ether, allyl hydroxypropyl sodium sultanate, and combinations thereof; the copolymer may further include about 0.1 to about 5 weight percent of the polymerizable phosphate surfactants and about 1 to about 30 weight percent of the linear or branched hydrophobic monomers; the copolymer may further comprise about 60 to about 90 weight percent of vinyl acetate and about 10 to about 30 percent of alkyl acrylate or alkyl methacrylate; the copolymer may further include a phosphate to hydrophobic relationship in terms of a weight ratio of the polymerizable phosphate surfactants (on an active basis) to the linear or branched hydrophobic monomers of about 1:5 to about 1:20; and/or the polymerizable phosphate surfactants may have a weight average molecular weight of about 100 to about 1500, in other approaches, about 100 to about 1000, and in yet other approaches, about 100 to about 500. Blends of materials such as amino, epoxy silanes, and aceto acetates are also possible.

DETAILED DESCRIPTION

Copolymers and latex paint compositions using such copolymers that are heat-age stable and provide good adhesion, block resistance, and hiding (when used in a latex paint) while using lower amounts of titanium dioxide and other pigments are described herein. In one aspect, the heat-age stable compositions include an acrylic, styrene acrylic, vinyl acrylic copolymer or blends thereof including, as additional polymerizable units, at least one polymerizable phosphate surfactant and at least one linear or branched hydrophobic monomer that are both polymerized into the acrylic, styrene acrylic, vinyl acrylic copolymer backbone. The copolymer may include titanium dioxide or an inorganic particle or pigment particle associated or combined with the acrylic, styrene acrylic or vinyl acrylic copolymer thereby forming a titanium dioxide or pigment-polymer composition or complex. These copolymers and polymer-pigment compositions or complexes surprisingly provide improved shelf life and/or heat-age stability over prior polymers and pigments while providing good adhesion, block resistance, and hiding at the same time when used in a latex paint. Furthermore, the latex paint compositions described herein achieve such performance preferably without the need for additional or a second latex polymers or copolymers to achieve stability. That is, in some approaches, the copolymers of the present disclosure are the sole or single latex polymer in the composition and function both as a binder and to form the polymer-pigment compositions or complexes to achieve the surprising latex paint compositions.

Certain terminology is used herein for convenience only and is not to be taken as a limitation on the present invention. Relative language used herein is best understood with reference to the drawings (if any), in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Glossary of Terms

"Opacity" or hiding (in some approaches) as used herein generally refers to the ability of a film to scatter light based on the thickness of the film. The Opacity is often expressed as S/mil and may be in the form of Kubelka-Munk scattering coefficients as determined using a modification of ASTM D 2805-70 as described in J. E. Mchutt and H. L. Ramsay in American Paint and Coatings Journal, April, 1988, p. 46 by the weight drawdown method, which is incorporated herein by reference.

"Opaque Polymer" as used herein generally refers to a polymeric network that encloses or substantially encloses a defined volume. In some embodiments an Opaque Polymer comprises polystyrene. Opaque polymers are commercially available from commercial vendors. Exemplary commercially available Opaque Polymers are Ropaque Ultra EF or Ropaque OP-96 EF (both available from the Dow Chemical Company, Midland, Mich.). In certain embodiments the defined volume of an Opaque Polymer comprises air forming a void that scatters light. For embodiments including a liquid within the defined volume, the liquid is eventually replaced with air, creating a void that scatters light. Opaque polymers may be used as a partial replacement for $TiO_2$ in paints or other coatings to enhance hiding and whiteness in paints and coatings.

"Pigment Volume Concentration" or "PVC" as used herein refers to a number that represents the volume of pigment compared to the volume of all solids. En the field of paints and coatings, PVC is a useful measure because the Binder acts as the material to unite all the pigment and other raw materials into the paint and the PVC value ensures there is enough Binder to enable the paint to adhere properly to whatever it has been applied over in addition to containing all of the other components of the paint. If a paint has no pigment at all it will usually be very glossy and have a PVC of zero. An example is clear gloss paints. Flat paints have a very high pigment loading and have high PVCs (usually in the range from about 35% up to about 80%). Another non-limiting exemplary range of PVC in which pigment can be loaded is from about 60% to about 75%, Primers and undercoats vary from 30% to about 50% PVC as do semigloss, satin and low sheen paints.

"$Y_{black}$" as used herein represents the reflectance value of a coating and measures the ability of a coating to cover against a black background, Measurement of $Y_{black}$ may be done as part of measurement of contrast ratio.

"$Y_{white}$" as used herein represents the reflectance value of a coating and measures the ability of a coating to reflect light against a white background. Measurement of $Y_{white}$ may be done as part of measurement of contrast ratio.

"Contrast Ratio" as used herein is calculated as $Y_{black}/Y_{white}$ and is the ratio of the reflectance of a film on a black substrate to that of an identical film on a white substrate. ASTM D2805-11 provides for the measurement of contrast ratio.

"Binder" as used herein refers to long chain molecules of polymers or resins that are film-forming materials. Binders are generally responsible for gluing or binding coating materials together and to the substrate. Latex polymers are a non-limiting example of a Binder that may be dispersed in water using a dispersant and film formation (or other network formation) occurs by joining (or coalescence) of these solid particles as water evaporates or is otherwise driven off. Exemplary Binders which may be used in the present disclosure include, but are not limited to, polyvinyl acetates, vinyl acrylics, styrene butadiene, styrene acrylics, ethylene vinyl polymers and copolymers as further discussed herein. In some approaches, the copolymers herein function as a paint binder and no further binder is utilized.

"Sheen" as used herein may also sometimes be referred to as "gloss". It is thought that because most extenders have a refractive index of light that is close to the refractive index of the Binders of most coatings, below CPVC an extender/latex film will be largely transparent to visible light. In a coating, a gloss finish indicates that the surface which has a coating applied to it (i.e., is "finished") it is shiny or glass-like. The gloss of a surface is described as the reflection of light from the surface that is independent of color. ASTM D523 may be used to measure sheen. The prescribed angle at which light is reflected off the surface may vary, but for the purposes of this disclosure to measure 85 Sheen, is measured at 85° relative to the surface reflecting the light. ASTM D523 may also be used to describe 60 Gloss which is measured at 60° relative to the surface reflecting the light. One of skill in the art is able to determine relative levels of gloss (low versus high) in context of each coating.

"Paint" as used herein refers to any mixture comprising different types of raw materials, each with its own function, which must be balanced to achieve the desired properties in the final product or film coating. The two primary functions of paint are decoration and protection. A paint may contain a solvent (which can include a volatile component derived from a petroleum distillate for a solvent-based paint, or a low VOC, or no-VOC, or water for a water-based paint), a Binder, a pigment, fillers (such as an extender or a plurality of extenders of different sizes) and an additive, which may impart different functionality to the paint or final coating. Embodiments may include a pigment cluster as a component thereof, optionally in combination with at least one of the solvent, Binder, pigment, filler and additive.

"Coatings" as used herein refer to compositions such as paint, stains, lacquers, etc.

"Additives" as used herein refer to a general category of components or other raw materials that may be added to the coatings herein to promote various properties. Examples include, but are not limited to, surfactants, defoamers, biocides, mildewcides, algaecides, thickeners, anti-settling agents, pH buffers, corrosion inhibitors, driers, and/or anti-skinning agents.

"Scrubbability" or "Scrub" as used herein generally refers to the ability of the coating to resist erosion caused by scrubbing.

"Washability" as used herein refers to the ability of a coating to exhibit stain resistance and stain removal properties.

"Absorb" or "adsorption" as generally used herein refers to a pigment or inorganic particle that has associated or contacted with the copolymers or has an affinity to the copolymers described herein, such as the phosphate groups of the polymerizable surfactants as described herein. This affinity or adsorption may be through physiorption, chemisorption, electrostatic attraction or by other means.

"Hindrance" or "Steric Hindrance" as generally used herein refers to a polymeric group that sterically lowers, controls, and regulates the ability of a polymeric monomer or polymeric surfactant to adsorb or associate with a pigment or inorganic particle. A steric hindrance group tends to be a bulky side chain or group extending from the polymeric backbone of the copolymers described herein. The steric hindrance group may either cover any adsorbing or associating monomer or surfactant of the copolymer or block access of the pigment or inorganic particle to the adsorbing or associating monomer or surfactant of the copolymer. As discussed further herein, the steric hindrance group can be selected from any linear or branched hydrophobic monomers, polymerized into the polymer backbone, with chain lengths of the steric hindering side group from C4 to C30.

"Heat-Age Stability" as generally used herein refers to a paint composition that exhibits less than a 5 to 10 unit KU viscosity increase after about 4 weeks of aging at about 140° F. and, preferably remains ungelled. Viscosity is measured in KU or Krebs Units in accordance with ASTM D562.

"Tint Strength" as generally used herein refers to the ability of a pigment to change the hue of another pigment and can be measured by comparing the tint strength value of a sample compared to a standard using a spectrophotometer to determine the percent increase or decrease of a paint sample as compared to the standard. If the tint strength is positive, then the sample has better hiding than the standard. If the tint strength is negative, then the sample has less hiding capability than the standard.

"Adhesion" or "Wet Adhesion" as generally used herein refers to a property of dried paint and the ability of a coating to adhere to a substrate under wet conditions. The standard method for wet adhesion of latex paints is to a glass alkyd enamel substrate. The test method used herein for adhesion is ASTM D6900-10.

"Blocking" or "Block Resistance" as generally used herein refers to the ability of the paint to resist adhesion to itself or another freshly coated surface and is measured by ASTM-D 4946-89 with results being <6 after 1, 3, and 7 days.

"Gloss" as generally used herein refers to the gloss intensity measured at 60 degrees and is determined according to ASTM D323.

Copolymer Backbone

According to one aspect, a pigment-polymer composition or complex for a latex paint composition is provided that is configured, in some approaches, to provide enhanced adhesion, block resistance, and biding in a stable paint composition with reduced levels of pigment or inorganic particles. The polymers and paint compositions exhibit good stability with little viscosity increase upon heat aging. The pigment-polymer composition or complex includes an acrylic, styrene acrylic or vinyl acrylic copolymer and/or blends thereof with, as polymerizable units, at least one polymerizable phosphate surfactant and at least one linear or branched hydrophobic monomer that is polymerized into the acrylic, styrene acrylic or vinyl acrylic polymer backbone. The composition or complex also includes a pigment or inorganic particle associated with the acrylic, styrene acrylic or vinyl acrylic copolymer forming the pigment-polymer composition or complex. The polymer is configured to provide the improved properties in a heat-age stable latex paint even when using less pigment or inorganic particles in the paint.

Turning to more of the specifics, the copolymer is preferably an acrylic, styrene acrylic, or vinyl acrylic polymer or copolymer and/or blends thereof including ethylenically unsaturated monomers with at least carboxylic acid, alkyl acrylate, alkyl methacrylate, or acetate moieties. The copolymer may include as polymerizable units in a polymer backbone vinyl monomers and acrylic monomers such as at least vinyl acetate, alkyl acrylate, alkyl methacrylate, acrylic, styrene acrylic, and combinations thereof. Alkyl groups of the monomers may have chain lengths from C1 to C4 and, in some approaches, are ethyl, propyl, isopropyl, butyl and the like side groups.

Preferred vinyl monomers are selected from the group consisting of vinyl esters, vinyl aromatic hydrocarbons, vinyl aliphatic hydrocarbons, vinyl alkyl ethers and mixtures thereof. Examples of vinyl esters that may be used include vinyl acetate, vinyl propionate, vinyl laurate, vinyl pivalate, vinyl nonanoate, vinyl decanoate, vinyl neodecanoate, vinyl butyrates, vinyl benzoates, and vinyl isopropyl acetates. Examples of vinyl aromatic hydrocarbons that may be used include styrene, methyl styrenes and other lower alkyl styrenes, chlorostyrene, vinyl toluene, vinyl naphthalene and divinyl benzene. Examples of vinyl aliphatic hydrocarbons that may be used include vinyl chloride and vinylidene chloride as well as alpha olefins such as ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene. Examples of vinyl alkyl ethers that may be used include methyl vinyl ether, isopropyl vinyl ether, n-butyl vinyl ether, and isobutyl vinyl ether.

Acrylic monomers suitable for use in the present invention include any compounds having acrylic functionality. Preferred acrylic monomers are selected from the group consisting of alkyl (meth)acrylates, acrylic acids, as well as aromatic derivatives of (meth)acrylic acid, acrylamides and acrylonitrile. Typically, the alkyl (meth)acrylate monomers (also referred to herein as "alkyl esters of (meth)acrylic acid") will have an alkyl ester portion containing from 1 to 12, preferably about 1 to 5, carbon atoms per molecule.

Suitable acrylic monomers include, for example, methyl (meth)acrylate, ethyl (meth)acrylate, butyl (meth)acrylate, propyl (meth)acrylate, 2-ethyl hexyl (meth)acrylate, cyclohexyl (meth)acrylate, decyl (meth)acrylate, isodecyl (meth)acrylate, benzyl (meth)acrylate, isobornyl (meth)acrylate, neopentyl (meth)acrylate, 1-adamatyl methacrylate and various reaction products such as butyl, phenyl, and cresyl glycidyl ethers reacted with (meth)acrylic acid, hydroxyl alkyl (meth)acrylates, such as hydroxyethyl and hydroxypropyl (meth)acrylates, amino (meth)acrylates, as well as acrylic acids such as (meth)acrylic acid, ethacrylic acid, alpha-chloroacrylic acid, alpha-cycanoacrylic acid, crotonic acid, beta-acryloxy propionic acid, and beta-styryl acrylic acid.

In some approaches, the copolymer includes about 60 to about 90 weight percent of a vinyl acetate monomer, and in other approaches, about 70 to about 80 weight percent of a vinyl acetate monomer. The copolymer may also include about 10 to about 30 weight percent of an alkyl acrylate or alkyl methacrylate monomer, and in other approaches, about 15 to about 25 weight percent of an alkyl acrylate or alkyl methacrylate monomer. The copolymer may further include about 0.05 to about 1.0 weight percent of an acrylic acid monomer, and in other approaches, about 0.05 to about 0.5 weight percent an acrylic acid monomer.

Polymerizable Phosphate Surfactant

The polymers or copolymers of the present disclosure also include, as additional polymerizable units, at least one polymerizable phosphate surfactant polymerized into the polymer backbone discussed above. By one approach, the polymerizable phosphate surfactant includes propoxylated or ethoxylated phosphate acrylate or propoxylated or ethoxylated phosphate methacrylate units and mixtures thereof polymerized into the polymer or copolymer backbone. In some approaches, the phosphate surfactant unit polymerized into the copolymer backbone has a weight average molecular weight of about 100 to about 1500, in other approaches, about 150 to about 1200, in other approaches, about 200 to about 1000, and in yet other approaches, about 200 to about 700. In some approaches and while not completely understood, the polymerizable phosphate surfactant may form a composition or complex with pigment particles or inorganic particles through an affinity or adsorption via physiorption, chemisorption, electrostatic attraction or by other means to the phosphate.

In one approach, the polymerizable phosphate surfactant polymerized into the polymer backbone includes polymeric units having the structure of formula 1 below:

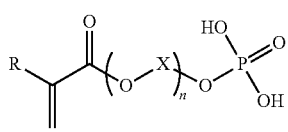

where R is either hydrogen or a methyl group, X is a linear or branched alkyl group, such as an ethyl or propyl group, and n is an integer selected to provide the molecular weight range as discussed above.

In some approaches, the copolymers herein include about 0.1 to about 5 weight percent of the polymerizable phosphate surfactant units polymerized into the polymer backbone, and in other approaches, about 0.5 to about 3 weight percent of the phosphate surfactant.

Linear or Branched Hydrophobic Monomer

The copolymer of the present disclosure also includes, as an additional polymerizable monomer, at least one linear or branched hydrophobic monomer that is also polymerized into the copolymer backbone. In some approaches, the linear or branched hydrophobic monomer includes long side chain vinyl ester monomers such as isobutylacrylate or methacrylate, tertiary butyl acrylate or methacrylate, ethyl hexyl acrylate or methacrylate, lauryl acrylate or methacrylate, octyl acrylate or methacrylate, isooctyl acrylate or methacrylate, dibutyl maleate, dioctyl maleate, branched or vinyl esters side chains, and combinations thereof. In other approaches, the linear or branched hydrophobic monomers include a vinyl ester with a C4 to C30 linear or branched carbon side chain and, in yet other approaches, a vinyl ester with a branched, and preferably saturated, C6 to C20 carbon chain as discussed more below.

While not wishing to be limited by theory, the long chain branched monomer tends to provide steric hindrance to the adsorption or affinity between the pigment or inorganic particles and the phosphate surfactant, which in some approaches, aids in the heat-age stability of the copolymers herein when used in a latex paint composition. For instance, the long chain polymeric group of the vinyl ester monomer tends to sterically control, regulate, or limit the ability of a phosphate surfactant to adsorb, associate, or form an affinity with a pigment or inorganic particle, which aids in the heat stability of the polymers herein. The steric hindrance group tends to be a bulky side chain or group extending from the polymeric backbone of the copolymers described herein. In some approaches, the monomer and/or the large bulky side chain may be non-polar or include non-polar hydrocarbon groups. The steric hindrance group may either cover at least a portion of any adsorbing or associating surfactant of the copolymer or block at least a portion of the access of the pigment or inorganic particle to the adsorbing or associating surfactant of the copolymer. As discussed further herein, the steric hindrance group can be selected from any linear or branched hydrophobic or non-polar monomers with chain lengths of the steric hindering group from C4 to C30, in other approaches, C6 to C20, and in yet other approaches C9 to C12, linear or branched carbon chains.

In some approaches, the branched carbon chain extending from the ester linkage of the hydrophobic monomer may be non-polar and may include at least 3 to 4 separate alkyl side chains extending from a C1 to C4 central alkyl moiety of a vinyl ester. In some approaches, each of the 3 to 4 separate alkyl side chains may be a C1 to C4 linear or branched hydrocarbon. In yet other approaches, the hydrophobic monomer may have a negative glass transition temperature (Tg). To this end and in some approaches, the linear or branched hydrophobic monomer may have a least a portion thereof polymerized adjacent to or at least within a close monomer position to provide the steric hindrance to the adsorption, affinity, or contacting of the pigment or inorganic polymer to the phosphate surfactant to aid in providing the stability and other paint characteristics described herein.

In some approaches, the copolymer may include about 5 to about 30 weight percent of the linear or branched hydrophobic monomer, and in other approaches, about 10 to about 20 weight percent of the linear or branched hydrophobic monomer. One example of a suitable branched hydrophobic monomer may be vinyl neodecanoate and vinyl neo nonate.

In some approaches, to help achieve the stability of the paint compositions including the copolymer and pigments or inorganic particles herein, a select surfactant-hydrophobic relationship in the copolymer may be helpful. For instance, too much phosphate surfactant relative to the hydrophobic monomer tends to result in instability of the polymer and paint compositions herein (i.e., excessive viscosity increase or gelling upon heat aging) and, on the other hand, too little surfactant results in poor hiding and contrast ratios of the paint compositions. By one approach, a phosphate-to-hydrophobic relationship in terms of a weight ratio of the polymerizable phosphate surfactant (on an active basis) to the linear or branched hydrophobic monomers in the copolymer to achieve heat-age stability, good adhesion, and hiding at the same time may be about 1:5 to about 1:20, and in other approaches about 1:5 to about 1:15, and in yet other approaches, about 1:8 to about 1:10.

Other Monomers

The copolymer of the present disclosure may include other monomers polymerized into the polymer backbone as needed for a particular application. For instance, the copolymer may further include ureido monomers, amino monomers, sulfonate monomers or surfactants, silane monomers, phosphate monomers or surfactants, carboxyl monomers or surfactants, and combinations thereof. In some approaches, the copolymer may further include vinyl monomers such as allyl imidazolidinone, allyl acetoacetates, allyl epoxies, epoxy acrylates, carbonyl monomers, other sulfonates, other phosphonates, vinyl phosphonate, allyl hydroxypopyl sodium sulfonate, allyloxy hydroxypropyl sodium sulfonate, and combinations thereof as needed for a particular application.

In some approaches, for instance, the other monomers may each be present in the copolymer in amounts up to about 10 weight percent, and in other approaches, about 0.1 to about 5 weight percent, in other approaches, about 0.5 to about 2 weight percent, but the amounts may vary depending on the particular application. In other approaches, the other or additional monomers may each be included in the polymer backbone in amounts less than about 1 weight percent.

In some approaches, the copolymer may include up to about 1 weight percent of ally imidazolidinone monomer to aid in the wet adhesion of the paint composition and up to about 1 weight percent of allyl hydroxypropyl sodium sulfonate monomer for stability to provide mechanical and thermal stability to the polymer and paint composition. In some approaches imidazolidone, sulfonate, and/or amide monomers are not needed.

Pigment or Inorganic Particle

The copolymer compositions and latex paints of the present disclosure also include a pigment or inorganic particle. Suitable pigment particles or inorganic particles used in the polymer compositions or complexes or the waterborne paint composition of the present disclosure may be titanium dioxide ($TiO_2$), zinc oxide ($ZnO_2$), calcium carbonate (CaCO$_3$), talc, clay materials, aluminum oxide, silicon dioxide, magnesium oxide, zinc sulfate, sodium oxide, potassium oxide, combinations thereof, or other known pigment or inorganic particles suitable for paints and other coatings. In some approaches, the pigment or inorganic particle is titanium dioxide, which may comprise anatase titanium dioxide or rutile titantium dioxide, or a mixture of the two. In other approaches, the pigment or inorganic particle comprises rutile titanium dioxide, to the exclusion of anatase titanium dioxide. In some approaches, the rutile titanium dioxide is surface treated with an inorganic oxide, such as silica (SiO$_2$). Generally, titanium dioxide has a particle size of from about 0.2 to about 0.3 microns in diameter and is provided in powder form, or in an aqueous slurry. An example of a titanium dioxide that is suitable for use in the present invention is Ti-Pure® R-706, which is commercially available from Ed, du Pont de Nemours and Company. Ti-Pure® R-706 titanium dioxide is a rutile titanium dioxide that is surface treated with silica.

Additionally, the copolymers herein provide desired latex paint characteristics with reduced loadings of pigment or inorganic particles due, in part and not wishing to be limited by theory, of the copolymers unique ability to maintain spacing and uniformity of the pigment or inorganic particle over a broad PVC range and without over absorbing the pigment particle to the extent the paints become unstable upon aging. For example, latex paint compositions may have a pigment or particle loading factor in terms of a weight ratio of inorganic particle or pigment to the copolymers herein (a pigment latex ratio) of greater than about 1:2, and in some approaches about 1.2 to about 1.3. In other approaches, the ratio may be greater than 1:2.1, which is preferably for paint compositions with gloss values below about 25, and still exhibit similar or better characteristics of stable paints with higher pigment loadings. In other approaches, such as for paint compositions with higher gloss values (greater than about 25), latex paint compositions herein may have a pigment latex ratio of greater than 1:2.2, and in other approaches, a pigment latex ratio of about 1:2.2 to 1:3. Latex paint compositions herein, therefore, have a higher loading of polymer relative to the pigments or inorganic particles than prior latex paints and still achieve heat-age stability.

Preparation of Polymer Compositions and Latex Paint Compositions

The present disclosure also includes methods of making the copolymers and paint compositions. The copolymers can be synthesized through emulsion polymerization techniques and the paint composition can be prepared using standard mixing methods for paint and coatings manufacture.

Preferably, the copolymers of the present disclosure may be formed by free radical emulsion polymerization by using techniques known to those of ordinary skill. By one approach, a reactor is first charged with an aqueous medium, any stabilizers and surfactants. Separately, a monomer pre-emulsion mixture is prepared by dispersing the various polymerizable units and monomers discussed above in an aqueous medium along with stabilizers, surfactants, defoamers, and the like. A small amount of the monomer pre-emulsion may be removed for seeding. Next, a redox oxidizer solution may be prepared by dissolving sodium persulfate and tert-butyl alcohol in water. A small amount of the redox oxidizer may also be removed for seeding. A reducer solution may be prepared by dissolving sodium meta bisulfite and a sulfuric acid derivative (Bruggolite FF6) in water. A small amount of the reducer solution may also be removed for seeding.

Next, a chase oxidizer solution and chase reducer solution may be prepared. The chase oxidizer solution is prepared by t-butyl hydroperoxide in water, and the chase reducer solution is prepared by combining sodium meta bisulfite and a sulfuric acid derivative (Bruggolite FF6) in water.

After a reaction hold period, the reactor may be cooled to about 60° C. or below whereupon the chase oxidizer and chase reducer solutions are fed to the reactor over a period of about 30 to 60 minutes. The reactor is again held for approximately 15 to 60 minutes. The reactor is then cooled further and any post addition ingredients, such as preservatives, defoamers, pH adjusters, and the like, may be added. The resultant polymer may be filtered if needed.

The water-borne coating composition of the present invention using the copolymers herein may be produced using conventional latex paint forming techniques known to those skilled in the art of manufacturing paint. In addition to the copolymer or binder latex described above (which may be the sole binder latex in the paints), an optional dispersant latex, an optional extender, and an optional thickener, the water-borne coating composition may contain conventional additives such as coalescing aids, biocides, anti-foaming agents, freeze-thaw additives, rheology modifiers, surfactants, preservatives, and the like and combinations thereof. It should also be appreciated that in addition to the pigment and the extender, small amounts of other pigments or colorants may be used to provide desired coloration or to confer other optical effects.

EXPERIMENTAL

The following examples demonstrate the preparation of copolymers and paint compositions such as those described herein above. The examples are intended to be representative of the polymers that can be made and are not intended to limit the scope of the present disclosure to the specific illustrative examples disclosed below. All percentages, ratios, and amounts in this disclosure are by weight unless otherwise specified.

Example 1

This Example prepares Polymer A (1.5% phosphate surfactant, 15% branched vinyl ester hydrophobic monomer) and formulated into a paint that remains stable on heat aging at 140° F. for four weeks. Polymer A had a phosphate to hydrophobic relationship of 1:10.

Polymer A is prepared as follows: Prepare the monomer pre-emulsion by mixing 638.50 grams of water, 0.8 grams sodium bicarbonate, 39.61 grams (60% active) anionic surfactant, 47.54 grams (50% active) nonionic surfactant, 53.41 grams of phosphate surfactant (55.6% active, Sipomer monomer, Solvay S. A.), 205.99 grams butyl acrylate, 1465.67 grams vinyl acetate, 1.99 grams acrylic acid, 9.9 grams allyl imidazolidinone, 24.5 grams allyloxy hydroxypropyl sodium sulfonate, and 297 grams branched vinyl ester (vinyl neodecanoate, veova monomer, Momentive Specialty Chemicals, Inc.).

Charge the reactor fitted with a paddle stirrer, a thermocouple, nitrogen inlet and reflux condenser with 877 grams water, 1 gram sodium bicarbonate, 39.61 grams (60% active) anionic surfactant. The contents of the flask are heated to 70° C. under nitrogen atmosphere. A solution of 0.14 grams of sodium persulfate in 6 grams of water was added to the reactor. The monomer pre-emulsion is fed to the reactor over 240 minutes. A redox pair consisting of solution of 5.9 grams of sodium persulfate in 75 grains water and 5.9 grams sodium meta bisulfite in 75 grams water were fed separately to the reactor over 245 minutes. The reaction was held at 70° C. for 30 minutes. The batch was then cooled to 613° C. and a redox pair consisting of 1.6 grams of sodium meta bisulfite in 15 grams of water and 2.26 grams of t-butyl hydro peroxide in 15 grams of water were fed separately to the reactor over 60 minutes. The reaction was held at 60'C for 30 minutes. The batch was cooled to room temperature.

Example 2

This Example prepares comparative Polymer B (1.5% phosphate, 0% branched vinyl ester hydrophobic monomer) and when formulated into a paint, it gelled in one week on heat aging at 140° F. Comparative Polymer B had a phosphate to hydrophobic relationship of 0.

Polymer B is prepared as follows: Prepare the monomer pre-emulsion by mixing 642.23 grams of water, 0.8 grams sodium bicarbonate, 33.14 grams (60% active) anionic surfactant, 47.71 grams (50% active) nonionic surfactant, 53.61 grams of the phosphate surfactant (55.6% active) of Example 1, 423.47 grams butyl acrylate, 1552.72 grams vinyl acetate, 1.99 grams acrylic acid, 9.9 grams allyl imidazolidinone, and 24.5 grams allyloxy hydroxypropyl sodium sulfonate.

Charge the reactor fitted with a paddle stirrer, a thermocouple, nitrogen inlet and reflux condenser with 878.7 grams water, 1 gram sodium bicarbonate, 33.14 grams (60% active) anionic surfactant. The contents of the flask are heated to 70° C. under nitrogen atmosphere. A solution of 0.14 grams of sodium persulfate in 6 grams of water was added to the reactor. The monomer pre-emulsion is fed to the reactor over 240 minutes. A redox pair consisting of solution of 5.9 grams of sodium persulfate in 75 grams water and 5.9 grams sodium meta bisulfite in 75 grams water were fed separately to the reactor over 245 minutes. The reaction was held at 70° C. for 30 minutes. The batch was then cooled to 60° C. and a redox pair consisting of 1.6 grams of sodium meta bisulfite in 15 grams of water and 2.26 grams of t-butyl hydro peroxide in 15 grams of water were fed separately to the reactor over 60 minutes. The reaction was held at 60° C. for 30 minutes. The batch was cooled to room temperature (20 to 25° C.).

Example 3

This Example prepares Polymer C (1.2% phosphate, 10% branched vinyl ester hydrophobic monomer) and formulated into a paint that remained stable on heat aging at 140° F. Polymer C had a phosphate to hydrophobic relationship of 1:8.3.

Polymer C is prepared as follows: Prepare the monomer pre-emulsion by mixing 733.15 grams of water, 0.8 grams sodium bicarbonate, 48 grams phosphate surfactant (55.6% active) of Example 1, 37.6 grams (60% active) anionic surfactant, 45 grams (50% active) nonionic surfactant, 369 grams butyl acrylate, 1644.6 grams vinyl acetate, 2.25 grams acrylic acid, 15.8 grams allyl imidazolidinone, 22.5 grams allyloxy hydroxypropyl sodium sulfonate, and 225 grams branched vinyl ester (vinyl neodecanoate) of Example 1.

Charge the reactor fitted with a paddle stirrer, a thermocouple, nitrogen inlet and reflux condenser with 937.4 grams water, 1.1 gram sodium bicarbonate, 15 grams (60% active) anionic surfactant, 45 grams (50% active) nonionic surfactant. The contents of the flask are heated to 70° C. under nitrogen atmosphere. A solution of 0.14 grams of sodium persulfate in 6 grams of water was added to the reactor. The monomer pre-emulsion is fed to the reactor over 240 minutes. A redox pair consisting of solution of 2.6 grams of sodium persulfate and 3.8 grams t-Butyl hydro peroxide in 115 grams water and 5.27 grams sodium meta bisulfate in 115 grams water were fed separately to the reactor over 245 minutes. The reaction was held at 70 C for 30 minutes. The batch was then cooled to 60° C. and a redox pair consisting of 1.8 grams of sodium meta bisulfate in 18 grams of water and 2.6 grams of t-butyl hydro peroxide in 18 grams of water were fed separately to the reactor over 60 minutes. The reaction was held at 60° C. for 30 minutes. The batch was cooled to room temperature.

Example 4

This Example prepares comparative Polymer D (1.2% phosphate, 0% branched vinyl ester hydrophobic monomer). Polymer D also has a phosphate to hydrophobic relationship of 0.

Polymer D is prepared as follows: Prepare the monomer pre-emulsion by mixing 644.79 grams of water, 0.6 grams sodium bicarbonate, 39.31 grams phosphate surfactant (55.6% active) of Example 1, 32.9 grams (60% active) anionic surfactant, 39.5 grams (50% active) nonionic surfactant, 419.1 grams butyl acrylate, 1542.20 grams vinyl acetate, 1.97 grams acrylic acid, 13.8 grams allyl imidazolidinone, and 19.77 grams alloxy hydroxypropyl sodium sulfonate.

Charge the reactor fitted with a paddle stirrer, a thermocouple, nitrogen inlet and reflux condenser with 822.55 grams water, 1 gram sodium bicarbonate, 13 grams (60% active) anionic surfactant, 39.5 grams (50% active) nonionic surfactant. The contents of the flask are heated to 70° C. under nitrogen atmosphere. A solution of 0.14 grams of Sodium persulfate in 6 grams of water was added to the reactor. The monomer pre-emulsion is fed to the reactor over 240 minutes. A redox pair consisting of solution of 2.37 grams of sodium persulfate and 2.82 grams t-butyl hydro peroxide in 115 grams water and 4.34 grams sodium meta bisulfate in 115 grams water were fed separately to the reactor over 245 minutes. The reaction was held at 70 C for 30 minutes. The batch was then cooled to 60° C. and a redox pair consisting of 1.6 grams of sodium meta bisulfite in 15 grams of water and 2.26 grams of t-butyl hydro peroxide in 15 grams of water were fed separately to the reactor over 60 minutes. The reaction was held at 60° C. for 30 minutes. The batch was cooled to room temperature.

Example 5

The copolymer compositions A, B, C, and D of Examples 1-4 were combined with titanium dioxide and formulated into an egg shell paint composition using standard latex paint forming techniques. Comparative paint compositions were also prepared utilizing conventional vinyl acrylate latex polymers, which did not include a polymerizable phosphate surfactant or a branched hydrophobic vinyl ester monomer. The paint compositions were tested for wet adhesion, blocking, y-reflectance, contract ratio, tint strength, and viscosity build after heat aging. The following tables provide relevant data of the comparisons.

TABLE 1

Egg Shell Paint Compositions

| Paint Compositions | Latex Polymer | TiO2 lbs | Latex lbs | Pigment Latex Ratio | Rheological Modifiers lbs | NVM, % | NVV, % | PVC, % |
|---|---|---|---|---|---|---|---|---|
| P1 | Polymer A | 170 | 422 | 1:2.48 | 19 | 52.9 | 40.56 | 31.55 |
| P2 | Polymer B | 170 | 422 | 1:2.48 | 19 | 52.9 | 40.56 | 31.55 |
| P3 | Polymer C | 170 | 380 | 1:2.23 | 19 | 48.57 | 36.63 | 34.45 |
| P4 | Polymer C | 185 | 424 | 1:2.29 | 25 | 52.38 | 40.42 | 32.8 |
| P5 | Polymer D | 185 | 424 | 1:2.29 | 25 | 52.38 | 40.42 | 32.8 |
| Comparison | Conventional vinyl acrylic | 212 | 406 | 1:1.91 | 18.5 | 54.73 | 41.67 | 30.79 |

TABLE 2

Egg Shell Paint Properties

| Paint Composition | Wet Adhesion, 1,7 days % | Block, 1 day | Block, 3 day | Block, 7 day | y-Reflectance, un-shaded | Contrast Ratio, shaded | Tint Strength | Gloss 60 |
|---|---|---|---|---|---|---|---|---|
| P1 | 100/100 | 4, 4, 4 | 4, 4, 4 | 4, 4, 4 | 92.74 | 0.965 | 14.46 | 11.2 |
| P2 | 100/100 | 4, 4, 3 | 4, 4, 4 | 4, 4, 4 | 92 | 0.965 | 11.98 | 11.1 |
| P3 | 100/100 | 4, 4, 4 | 4, 4, 3 | 4, 4, 4 | 92.38 | 0.971 | 6.32 | 9.3 |
| P4 | 100/100 | 4, 4, 3 | 5, 4, 4 | 5, 5, 4 | 93.67 | 0.968 | 13.21 | 10.9 |
| P5 | 100/100 | 4, 3, 3 | 4, 4, 3 | 4, 4, 3 | 92.56 | 0.972 | 8.74 | 10.8 |
| Comparison | 0, 0 | 4, 3, 1 | 4, 3, 3 | 4, 3, 3 | 91.08 | 0.961 | 2.04 | 11.2 |

TABLE 3

Egg Shell Latex Paint Viscosity

| Paint Composition | Initial KU Viscosity | Viscosity, KU, after 4 weeks heat aging at 140° F. | |
|---|---|---|---|
| P1 | 92 | 96 | stable |
| P2 | 97 | gell after 1 week | unstable |
| P3 | 94 | 90 | stable |
| P4 | 94 | 94 | stable |
| P5 | — | >20 units | unstable |
| Comparison | 98 | 97 | stable |

Example 6

The copolymer composition C of Example 3 was also formulated into a semi-gloss paint composition and compared to a paint formulated with the conventional vinyl acrylic latex of Example 5 and a commercially available latex (Evoque 1180). The conventional vinyl acrylic did not include a polymerizable phosphate surfactant or a branched hydrophobic vinyl ester monomer. The following tables provide relevant data of the comparisons.

TABLE 4

Semi-Gloss Paint Compositions

| Paint Compositions | Latex Polymer | TiO2 lbs | Latex lbs | Pigment Latex Ratio | Rheological Modifiers lbs | NVM, % | NVV, % | PVC, % |
|---|---|---|---|---|---|---|---|---|
| P7 | Polymer C | 155 | 400 | 1:2.58 | 24.7 | 45.59 | 34.99 | 27.07 |
| Comparison-1 | Conventional vinyl acrylic | 180 | 390 | 1:2.16 | 32.5 | 49.64 | 38.41 | 25.7 |
| Comparison-2 | Commercially available Polymer (Evoque 1180) | 155 | 400 | 1:2.58 | 24.7 | 45.59 | 34.99 | 27.07 |

TABLE 5

Semi-Gloss Paint Properties

| Paint Composition | Wet Adhesion, 1, 7 days % | Block, 1 day | Block, 3 day | Block, 7 day | y-Reflectance, un-shaded | Contrast Ratio, shaded | Tint Strength | Gloss 60 |
|---|---|---|---|---|---|---|---|---|
| P7 | 100/100 | 5, 5, 4 | 5, 5, 5 | 5, 5, 5, | 92.67 | 0.962 | 3.42 | 30.3 |
| Comparison-1 | 0, 0 | 4, 3, 1 | 4, 4, 3 | 4, 4, 4 | 95.55 | 0.957 | −1.24 | 30.5 |
| Comparison-2 | 100/100 | 5, 4, 4 | 5, 5, 4 | 5, 5, 5 | 92.45 | 0.966 | 7.4 | 25.1 |

TABLE 6

Semi-Gloss Latex Paint Viscosity

| Paint Composition | Initial KU Viscosity | Viscosity, KU, after 4 weeks heat aging at 140° F. | |
|---|---|---|---|
| P7 | 94 | 95 | Stable |
| Comparison-1 | 98 | 97 | Stable |
| Comparison-2 | 110 | 130 | Unstable |

Unless otherwise specified, all measurements herein are made at 23±1° C. and 50% relative humidity. All publications, patent applications, and issued patents mentioned herein are hereby incorporated in their entirety by reference. Citation of any reference is not an admission regarding any determination as to its availability as prior art to the claimed invention.

The dimensions and values disclosed herein are not to be understood as being strictly limited to the exact numerical values recited. Instead, unless otherwise specified, such as dimension is intended to mean both the recited value and a functionally equivalent range surrounding that value. All ranges noted are intended to mean any endpoint within that range. For example, a dimension disclosed as "40 mm" is intended to mean "about 40 mm".

Illustrative embodiments have been described, hereinabove. It will be apparent to those skilled in the art that the above devices and methods may incorporate changes and modifications without departing from the general scope of this disclosure. It is intended to include all such modifications and alterations within the scope of the present disclosure. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A heat-age stable latex paint composition comprising a vinyl acrylic copolymer including as polymerized units, at least one phosphate surfactant and at least one linear or branched hydrophobic monomer;
titanium dioxide particles associated with the vinyl acrylic copolymer forming a pigment-copolymer complex;
water; and
wherein the latex paint composition exhibits a contrast ratio of about 0.9 to about 0.99 and a y-reflectance of about 90 to about 100;
wherein the heat-age stable latex paint composition includes about 30 to about 50 weight percent of the vinyl acrylic copolymer and about 10 to about 25 weight percent of the titanium dioxide particles;
wherein the copolymer includes about 0.5 to about 5 weight percent of the phosphate surfactant and about 5 to about 20 weight percent of the linear or branched hydrophobic monomer, wherein the linear or branched hydrophobic monomer is a vinyl ester with a C6 to C30 linear or branched carbon chain; and
wherein the copolymer includes about 60 to about 80 weight percent of vinyl acetate and about 10 to about 25 weight percent of alkyl acrylate or alkyl methacrylate, wherein the alkyl acrylate or alkyl methacrylate includes one or more alkyl groups selected from the group consisting of C1, C2, C3, and C4 alkyl hydrocarbon chains.

2. The heat-age stable latex paint composition of claim 1, further comprising a KU viscosity increase after 4 weeks of aging at about 140° F. of no more than about 10 units.

3. The heat-age stable latex paint composition of claim 1, wherein the copolymer further includes as polymerized units, ureido monomers, amino monomers, sulfonate monomers or sulfonate surfactants, silane monomers, phosphate monomers, carboxyl monomers or carboxyl surfactants, and combinations thereof.

4. The heat-age stable latex paint composition of claim 1, wherein the at least one phosphate surfactant includes propoxylated or ethoxylated phosphate acrylate, propoxylated or ethoxylated phosphate methacrylate, or blends thereof.

5. The heat-age stable latex paint composition of claim 1, wherein at least a portion of the phosphate surfactant is polymerized adjacent to the linear or branched hydrophobic monomer.

6. The heat-age stable latex paint composition of claim 1, further comprising additional polymerized units selected from the group consisting of styrene, allyl imidazolidinone, allyl hydroxypropyl, sodium sulfate, and combinations thereof.

7. The heat-age stable latex paint composition of claim 1, further comprising a weight ratio of the phosphate surfactant to the linear or branched hydrophobic monomer of about 1:5 to about 1:20.

8. The heat-age stable latex paint composition of claim 1, wherein the phosphate surfactant has a weight average molecular weight of about 300 to about 1500.

9. The heat-age stable latex paint composition of claim 1, further including additives selected from the group consisting of extender pigments, rheology modifiers, surfactants, and combinations thereof.

* * * * *